(12) United States Patent
Shaffer et al.

(10) Patent No.: US 11,383,390 B2
(45) Date of Patent: Jul. 12, 2022

(54) ROBOTIC WORK CELL AND NETWORK

(71) Applicant: Robotik Innovations, Inc., Palo Alto, CA (US)

(72) Inventors: Matthew E. Shaffer, Menlo Park, CA (US); Christopher Lalau Keraly, San Francisco, CA (US); Clinton J. Smith, San Francisco, CA (US); Christopher A. Paulson, Redwood City, CA (US); Bernard D. Casse, Saratoga, CA (US)

(73) Assignee: RIOS Intelligent Machines, Inc., Menlo Park, CA (US)

( * ) Notice: Subject to any disclaimer, the term of this patent is extended or adjusted under 35 U.S.C. 154(b) by 329 days.

(21) Appl. No.: 16/832,840

(22) Filed: Mar. 27, 2020

(65) Prior Publication Data
US 2020/0306988 A1    Oct. 1, 2020

Related U.S. Application Data

(60) Provisional application No. 62/826,865, filed on Mar. 29, 2019, provisional application No. 62/826,883, filed on Mar. 29, 2019.

(51) Int. Cl.
*B25J 13/08* (2006.01)
*B25J 9/16* (2006.01)
*G06N 20/00* (2019.01)

(52) U.S. Cl.
CPC ............ *B25J 13/087* (2013.01); *B25J 9/163* (2013.01); *B25J 9/1612* (2013.01); *B25J 13/082* (2013.01); *G06N 20/00* (2019.01)

(58) Field of Classification Search
CPC ........ B25J 13/087; B25J 9/1612; B25J 9/163; B25J 13/082; B25J 9/1674; B25J 13/08;
(Continued)

(56) References Cited

U.S. PATENT DOCUMENTS

| | | | | |
|---|---|---|---|---|
| 4,651,074 A | * | 3/1987 | Wise | G01L 5/228 250/227.24 |
| 5,143,505 A | * | 9/1992 | Burdea | B25J 13/02 244/234 |

(Continued)

*Primary Examiner* — Jaime Figueroa
(74) *Attorney, Agent, or Firm* — Bever, Hoffman & Harms, LLP

(57) ABSTRACT

A robotic network includes multiple work cells that communicate with a cloud server using a network bus (e.g., the Internet). Each work cell includes an interface computer and a robotic system including a robot mechanism and a control circuit. Each robot mechanism includes an end effector/ gripper having integral multimodal sensor arrays that measure physical parameter values (sensor data) during interactions between the end effector/gripper and target objects. The cloud server collects and correlates sensor data from all of the work cells to facilitate efficient diagnosis of problematic robotic operations (e.g., accidents/failures), and then automatically updates each work cell with improved operating system versions or AI models (e.g., including indicator parameter value sets and associated secondary robot control signals that may be used by each robot system to detect potential imminent robot accidents/failures during subsequent robot operations.

11 Claims, 3 Drawing Sheets

(58) Field of Classification Search
CPC .......... B25J 19/02; G06N 20/00; Y02P 90/02; G05B 19/4184
USPC .................................................. 700/245–264
See application file for complete search history.

(56) References Cited

U.S. PATENT DOCUMENTS

| | | | | |
|---|---|---|---|---|
| 5,354,162 A * | 10/1994 | Burdea | ................... | G06F 3/016 414/4 |
| 5,739,476 A * | 4/1998 | Namgung | ............ | H05K 3/4641 174/255 |
| 6,343,263 B1 * | 1/2002 | Nichols | ................. | H04M 11/06 702/189 |
| 6,652,015 B1 * | 11/2003 | Carney | ................... | B25J 15/10 294/902 |
| 6,760,679 B1 * | 7/2004 | Carney | .............. | G01N 25/4853 702/94 |
| 10,518,409 B2 * | 12/2019 | Oleynik | .................... | B25J 3/04 |
| 10,682,774 B2 * | 6/2020 | Bingham | ............... | B25J 9/1035 |
| 10,850,386 B2 * | 12/2020 | Berger | .................... | B25J 5/007 |
| 2003/0082042 A1 * | 5/2003 | Woodruff | .......... | H01L 21/68707 414/744.5 |
| 2005/0079375 A1 * | 4/2005 | Dean | ...................... | H05K 3/025 428/209 |
| 2006/0145494 A1 * | 7/2006 | Nihei | .................... | B25J 9/1612 294/106 |
| 2008/0297340 A1 * | 12/2008 | Popa | ................... | H01L 41/1132 310/317 |
| 2012/0061155 A1 * | 3/2012 | Berger | ................. | B25J 19/0016 180/21 |
| 2012/0202386 A1 * | 8/2012 | McNamara | ........ | H01R 13/6587 439/629 |
| 2013/0238129 A1 * | 9/2013 | Rose | .................... | B25J 19/0029 700/258 |
| 2013/0302126 A1 * | 11/2013 | Schaller | .................... | B25J 9/10 414/737 |
| 2014/0251702 A1 * | 9/2014 | Berger | .................... | B25J 5/007 180/21 |
| 2015/0290795 A1 * | 10/2015 | Oleynik | ................ | A47J 36/321 700/257 |
| 2015/0336264 A1 * | 11/2015 | Berger | .................. | B25J 9/0006 180/21 |
| 2019/0176348 A1 * | 6/2019 | Bingham | ............... | B25J 9/1035 |
| 2019/0339685 A1 * | 11/2019 | Celia | ................ | G05B 23/0283 |
| 2019/0339686 A1 * | 11/2019 | Celia | .................. | G05B 23/0264 |
| 2019/0339687 A1 * | 11/2019 | Celia | ................ | G05B 23/0283 |
| 2020/0262089 A1 * | 8/2020 | Bingham | ............... | B25J 19/023 |
| 2021/0293643 A1 * | 9/2021 | Correll | ................. | B25J 15/0009 |

* cited by examiner

ROBOTIC WORK CELL AND NETWORK

RELATED APPLICATION

This application claims priority from U.S. Provisional Patent Application No. 62/826,865, entitled "Robotik Smart Networked Work Cell Architecture", filed on Mar. 29, 2019, and from U.S. Provisional Patent Application No. 62/826,883, entitled "Robotic Gripper with Integrated Multi-Modal Tactile Sensor Arrays", filed on Mar. 29, 2019.

FIELD OF THE INVENTION

This invention relates generally to robotic systems and more particularly to robotic systems having tactile sensors and re-programmable robot mechanism controllers.

BACKGROUND OF THE INVENTION

Most modern robotic systems integrate mechanical, electrical/electronic and computer science technologies to provide autonomously controlled mechanisms capable of performing a variety of programmed robotic operations (tasks). For example, articulated robots are a class of industrial robotic systems in which a control circuit converts user-provided software-based instructions into motor control signals that control a robot arm mechanism and attached end effector (i.e., an end-of-arm-tooling device, such as a robotic gripper that performs functions similar to those performed by a human hand) to perform repetitive tasks, such as grasping target objects while the robot arms moves the target objects from one location to another location. To perform such programmed operations, the software-based instructions provided to most articulated robots must specify three-dimensional (3D) coordinates of the starting location at which the target objects are located for pick-up, a designated 3D travel path through which the target objects may be moved without interference, and 3D coordinates defining the terminal location (e.g., a receptacle or support surface) at which the target objects are to be placed. When suitable software-based instructions are provided for performing a specific robotic operation, the system controller generates a corresponding series of motor control signals that cause the robot arm mechanism to move the end effector to the initial/starting location coordinates, then cause the gripper to close on (grasp) the target object, then cause the robot arm mechanism to lift/move the target object to the terminal location coordinates along the designated travel path, and then cause the gripper to release the target object.

A significant limitation of conventional robotic systems is their lack of human-hand-type sensory input that would allow adjustment to a wide range of common operational irregularities and/or to perform advance robotic operations. That is, unlike the sensor systems found in human hands that provide multimodal sensory feedback (i.e., mechanoreceptors sensing both pressure and vibration, and thermoreceptors sensing temperature), the robotic grippers utilized in most conventional robotic systems utilize no sensing architecture, and those that do utilize single-modality sensing architectures (e.g., pressure sensing only) or visual input via camera system. The multimodal sensing architecture found on human hands provides fine-grained cues about contact forces, textures, local shape around contact points, and deformability, all of which are critical for evaluating an ongoing grasping operation, and to trigger force correction measures in case of instability. In contrast, conventional robotic systems that utilize grippers having no tactile sensing architecture or visual input rely entirely on pre-programmed commands, whereby these systems typically fail to adjust for minor positional variations to unanticipated environmental variations. For example, even a small positional displacement of a target object away from its program-designated starting location coordinates may prevent successfully grasping by the gripper, and in some cases may result in damage to the target object and/or gripper (e.g., due to off-center contact between the gripper and the target object during the grasping operation). While grippers having single-modality sensing architectures and/or camera systems provide some feedback information to the host robotic system's control circuit, thereby allowing the control circuit to modify user-provided program instructions in order to correct for a small number of specific operating environment irregularities (e.g., minor target object positional variations relative to expected programmed coordinates), they are incapable of addressing a wide range of operating environment irregularities and/or perform more advanced robotic operations. For example, although single-modality pressure sensors may provide sufficient data to verify that a predetermined gripping force is being applied onto a target object, such single-modality pressure sensors are unable to recognize when the target object may be slipping from the gripper's grasp, and therefore are unable to avoid the resulting accident damage to the target object if dropped.

Although it would be possible to enhance the capabilities of conventional arm-type robotic systems by way of adding additional sensors, simply adding sensors to existing gripper structures would be problematic. First, the addition of gripper-mounted sensors using conventional methods would require signal lines (one for each sensor) that would extend along the arm mechanism from each sensor to the system controller; this requirement would both limit the number of sensors that could be accommodated, and could also present weight-related issues when large numbers of signal lines are required. Moreover, the robotic system's controller would require substantial modification and/or reprogramming to facilitate processing of data received from a large number of sensors.

Another limitation of conventional robotic systems is that there is no efficient way to detect, correct and update the operating (software) programs of multiple similar robotic systems to address an accident or learning event that is experienced by one of the robotic systems (i.e., so that the remaining robotic systems avoid the same accident and/or adapt the learning event to achieve better performance). That is, conventional robotic systems fail to include sensors capable of detecting operating parameters related to the occurrence of an accident (e.g., applied gripping force when an object slips from a gripper's grasp), and fail to include a mechanism that can automatically apply a corrective measure capable of preventing a repeat of the accident (e.g., increase the applied gripping pressure when the object begins to slip). Moreover, the operating system/program of a given conventional robotic system is typically entirely independent from (i.e., does not communicate with) the operating systems of other similarly configured robotic systems—this independent operating system paradigm prevents program updates (modifications) that may be developed for one robotic system from being efficiently shared with similar robotic systems. By way of example, assume the identical operating programs provided with multiple similar robotic systems are configured to calculate an applied gripping force of ten kilopascals (kPa) for purposes of grasping/moving a hypothetical standardized object, and that all of the robotic systems are utilized to grasp/move the standardized object in a similar manner. Assume also that one of these robotic systems experiences intermittent accidents involving dropped objects, and that the actual cause is an intermittent temporary drop in friction between the gripper's fingers and a grasped object that occurs when the robot encounters certain environmental conditions (e.g., temperatures below 10° C.). It would be very difficult to determine the cause of the intermittent accidents when they occur in conventional robotic systems that do not include any sensors. Further, conventional robotic systems that include single-modality pressure sensors may detect that the applied gripping pressure was maintained at ten kPa during each intermittent accident, but this information would be insufficient to correlate the accidents with cold temperatures, and would be unable to provide a software correction (e.g., increase grip pressure on cold days) that could prevent repeats of the accident in the future. Further, even if an operator properly deduces that the intermittent accidents are related to low operating temperatures and modifies the robotic system's operating program to apply twelve kPa of gripping force on cold days, the corrective measure would only be applied to the operator's robotic system. That is, although the operating program of the operator's robotic system may be successfully modified to the intermittent cold-object-drop accident, conventional robotic systems do not provide a mechanism for this operating program modification to be efficiently conveyed to the other similar robotic systems that might, in exchange, provide corrective actions that address other types of accidents/failures. As a result, the overall average performance of multiple similarly configured conventional robotic systems is destined to remain sub-optimal, thereby wasting valuable energy and resources that could be spend on more beneficial pursuits.

What is needed is a cooperative arrangement in which the operating performance of multiple similarly configured robotic systems is efficiently improved. For example, what is needed is an arrangement capable of diagnosing the causes of robotic operation accidents/failures that are commonly experienced by the multiple robotic systems, and capable of efficiently modifying all of the robotic systems to include subsequently developed corrective actions that prevent or mitigate reoccurrences of the accidents/failures. Preferably, such an arrangement would be configured to prevent proprietary information of each robotic system's user/owner (e.g., command sequences developed to execute a specific robot operation) from being undesirably disclosed to the other robotic system users/owners.

SUMMARY OF THE INVENTION

The present invention is directed to a robotic network (and associated network operating method) that utilizes enhanced multimodal sensor configurations disposed on multiple robotic systems to measure various physical parameters during robot operations involving interactions between each robotic system's end effector and target objects, and utilizes a cloud server to receive the enhanced multimodal sensor data generated by the robotic systems, which facilitates the efficient detection of potential non-optimal operating system processes and the development of operating system software updates that address (e.g., improve or optimize) the non-optimal processes, and to automatically distribute subsequently developed updated operating system software (e.g., revisions to artificial intelligence (AI) or machine learning models) to every robotic system of the network. The robotic network facilitates this cooperative interaction by way of including each individual robotic system in an associated work cell that also includes an interface computer, where each work cell's interface computer facilitates communications between a control circuit of its associated robotic system and the cloud server over a network bus (e.g., the Internet or a local area network). In a practical embodiment, the interface computer of each work cell is also configured to allow a user/owner to enter user-designated instructions in order to control the associated robot system to perform a desired specific robot operation. In a presently preferred embodiment, the robot mechanisms of the multiple robotic system have a similar configuration, where all of the robotic systems generally include a robotic arm that is fixed at one end and has a gripper (or other end effector) connected to its distal (free) end, and where operations performed by the arm and gripper are controlled by signals transmitted from a control circuit to arm (first) actuators and gripper (second) actuators disposed on the robot arm and gripper, respectively. To facilitate the collection of enhanced multimodal sensor data each robotic system includes one or more multimodal sensor arrays including different types of sensors that respectively measure associated physical parameter values (e.g., applied gripper pressure, target object temperature and other forms of tactile information). The control circuit of each associated robotic system includes (i.e., is configured to operate in accordance with) an operating system (i.e., a software program executed by one or more processors, which may include an AI or machine learning model) that it uses during normal operations to convert the user-designated instructions into corresponding primary robot control signals that cause the various actuators of the robot mechanism to perform the desired specific robot operation. By providing each robotic system of the robotic network with multimodal sensor arrays configured to generate measured physical parameter values that provide rich sensory tactile data describing the robotic system's operating environment, the present invention facilitates the accurate diagnosis of non-optimal robot operations (e.g., by way of recording various physical parameter values that may be utilized to accurately identify the cause of robotic operation accidents/failures). Moreover, by configuring robotic network such that the measured physical parameter values from multiple similarly configured robotic systems is collected (combined together) by the cloud server, the present invention achieves highly efficient diagnosis of non-optimal robot operations by way of enabling comparisons between similar measured physical parameter values received from widely dispersed robot systems. Further, by configuring each robotic system such that operating system updates can be efficiently transferred to the control circuit of each robotic system, the present invention facilitates an improvement in overall robot operation performance that is shared by all of the network's work cells. Finally, by configuring the robotic network such that the measured physical parameter values are only received by the cloud server, the present invention facilitates easily implemented protocols to protect the proprietary information of different work cell owners/users by, for example, configuring the shared enhanced multimodal sensor data to omit any proprietary information and/or by imposing a non-disclosure condition on the cloud server operator. In some embodiments the various different deployed work cells can have different configurations or identical configurations depending on the user preferences. Taken together, the entire network operates as a collective learning system whose communications take place either in real-time or through delayed synchronizations.

According to a practical exemplary embodiment, the robotic network is configured to improve the overall robot operation performance of multiple work cells by way of collecting measured physical parameter values of a type suitable for diagnosing the causes of robot operation accidents/failures (e.g., the cause of the intermittent cold-object-drop accident example introduced in the background section), and by way of distributing subsequently developed accident/failure avoidance operations to all of the work cells. Providing each robotic system with a multimodal sensor array of the type described above allows each robotic system to detect/measure a wide range of environmental conditions that occur immediately before a given accident/failure, thereby facilitating a detailed diagnosis of the given accident/failure's cause(s). In some embodiments the measured physical parameter values are transmitted and recorded in "raw" form by the cloud server, and in other embodiments the "raw" values are converted or processed into condensed tactile information to facilitate efficient transmission—in either case, the measured physical parameter values provide a detailed record of the interactions between the end effector and target objects during multiple robot operations that resulted in the accident/failure. In one embodiment the accident/failure diagnosis includes identifying both (i) reoccurrence indicator parameter values (i.e., specific physical parameter values (or ranges thereof) that, when detected during robot operations, indicate the potential imminent reoccurrence of the given accident/failure), and (ii) at least one accident/failure avoidance/mitigation operation (e.g., one or more secondary robot control signals that, when transmitted to and executed by one or more of the robot mechanism's actuators, causes the robot mechanism to operate in a way that either avoids/prevents reoccurrence of the accident/failure, or mitigates damage caused by the accident/failure reoccurrence). Upon completion of the diagnosis process the cloud server automatically transmits the accident/failure avoidance operation to the control circuit of each work cell (i.e., by way of the network bus and each work cell's interface computer) such that all of the work cells receive a copy of the accident/failure avoidance operation. In one embodiment the accident/failure avoidance operation is transmitted in the form of an updated operating system that replaces or modifies the existing (initial) operating system included in the control circuit, whereby subsequent robot operations are performed in accordance with the updated operating system. For example, in accordance with the updated operating system, the control circuit of each work cell may (a) store multiple sets of indicator parameter values in a way that facilitates comparison with measured physical parameter values generated by the multimodal sensor array(s), and (b) during subsequently execution of the owner/user-provided specific robot operation (i.e., transmitting the primary robot control signals to the robot mechanism actuators), periodically compare currently measured physical parameter values with the stored sets of indicator parameter values, and execute an accident/failure avoidance/mitigation operation only when the currently measured physical parameter values match an associated stored set of indicator parameter values. That is, while the currently measured physical parameter values indicate an expected normal operating state (i.e., do not match any of the sets of stored indicator parameter values), the modified/updated operating system causes the control circuit to actuate robot mechanism in the manner produced by the previous (non-updated) version of the operating system (i.e., assuming the previous version did not include the accident/failure avoidance/mitigation operation). However, because the modified/updated operating system causes the control circuit to compare currently measured physical parameter values with the stored set of indicator parameter values, if at some point during robot operations a match occurs, then the modified/updated operating system causes the control circuit to transmit corresponding secondary robot control signals (i.e., either in combination with the primary robot control signals, or by way of transmitting corresponding secondary robot control signals while interrupting and/or overriding the primary robot control signals), thereby causing the robot mechanism to terminate or modify the primary robotic operation in a way defined by the secondary robot control signals that prevents or mitigates the corresponding robot accident/failure. By configuring each work cell of the robotic network such that the operating system of each control circuit can be automatically updated by the cloud server, the present invention facilitates an improvement in overall robot operation performance that is shared by all of the network's work cells by way of implementing new or revised corrective actions that prevent/mitigate the reoccurrence of commonly occurring accidents/failures.

In an exemplary embodiment, the proposed methodology is applied to the intermittent cold-object-drop accident example, introduced above. In this exemplary embodiment, the proposed methodology includes correlating measured temperature and pressure (physical parameter) values generated by one or more multimodal sensor arrays prior to or during the previous occurrence of one or more cold-object-drop accidents in order to identify an underlying cause (e.g., objects are dropped when their temperature is below 10° C.). Once the accident's cause is identified, a suitable corrective action may be devised that, when performed by each work cell, prevents reoccurrence of the cold-object-drop accident. For example, experiments may be conducted at various temperatures and grip pressures to determine that reoccurrences of cold-object-drop accidents are reliably prevented by temporarily increasing the applied gripper pressure (e.g., from the normal ten kPa to twelve kPa) whenever a currently grasped target object's temperature is at or below 10° C. Based on this diagnosis, a corresponding operating system update is then generated that includes, for example, indicator parameter values suitable for detecting the potential imminent reoccurrence of the cold-object-drop accident (e.g., the indicator parameter values may include a check for currently measured object temperature values equal to or below 10° C.), and also includes one or more corresponding secondary robot control signals that prevent or mitigate the accident (e.g., a command to increase gripper pressure to twelve kPa when currently measured physical parameter values match the stored indicator parameter value). After being transmitted to the work cells by the cloud server, this operating system update modifies the performance of the control circuit of each work cell during subsequent robot operations, for example, by causing the control circuit to store the indicator parameter value (i.e., object temperature greater than or equal to ten degrees Celsius), to compare the stored value with currently measured temperature values generated by temperature sensor(s) of the multimodal sensor array, and to increase the gripper pressure to twelve kPa (e.g., by transmitting the secondary robot control signals to the gripper actuator) whenever a currently measured temperature value is at or below 10° C., thereby preventing reoccurrence of cold-object-drop accidents. In other embodiments the indicator parameter values may include any of the other measured physical parameter values or a combination thereof, and the secondary robot control signals may be used to perform any suitable accident preventing operation performed by the robot arm or gripper or a combination thereof, and may be used to perform an operation designed to mitigate damage caused by an associated accident (i.e., when a suitable accident prevention operation cannot be identified, the secondary robot control signals may be selected, for example, to perform an arm/gripper action that functions to minimize damage to a dropped object, or to minimize damage to the robot mechanism that may be incurred by a reoccurrence of an associated accident/failure).

According to a practical embodiment, the robotic system of each work cell includes an arm-type robot mechanism (robot arm) having a fixed base portion at one end that is fixedly secured to a base structure (e.g., a table), and a gripper-type end effector (robotic gripper) connected to the opposing distal (free) end portion of the arm-type robot mechanism. In a presently preferred embodiment, the control circuit includes two controller/processor circuits: a robot arm controller and a gripper controller. The robot arm controller is mounted, for example, on the base/table below the arm-type robot mechanism, and is configured to control the operation of the robot arm by way of transmitting arm control signals on wires/conductors extending along the robot arm to arm actuators operably disposed on the robot arm (e.g., at connection points between contiguous arm structures). The gripper controller is operably disposed on (e.g., integrated into) the robotic gripper and configured both to receive and process measured physical parameter values generated by the multimodal sensor arrays disposed on the gripper, and to generate local finger control signals that control at least some of the operations (e.g., grasping and releasing objects and other gripper operations) performed by the robotic gripper. In an exemplary embodiment, the robot arm controller generates primary robot control signals during normal robotic operations, where the primary robot control signals include both the arm control signals transmitted to the arm actuators and the system gripper control signals transmitted to the finger actuators, and the gripper controller generates secondary robot control signals only under abnormal operating conditions (e.g., when a potentially dangerous condition is detected), where the secondary robot control signals include finger control signals that control the finger actuators in a predefined way to avoid an undesirable outcome. This arrangement facilitates highly coordinated arm/gripper operations (i.e., by utilizing the robot arm controller to generate both the arm control signals and the system gripper control signals under normal operating conditions). In addition, by configuring the robotic system's control circuit to include separate arm and gripper controllers such that gripper finger operations are directly controlled by the gripper controller when a potential imminent accident/failure is detected (i.e., by way of transmitting the finger control signals directly to the finger actuators), the present invention increases the system's ability to prevent or mitigate the potential accident/failure by substantially reducing latency (i.e., increases the robotic system's ability to quickly respond to potentially harmful or dangerous operating conditions) without requiring the owner/user of each work cell to take any overt action.

In one embodiment, each gripper controller is configured to generate the finger control signals and the tactile information by processing the measured physical parameter values (sensor data) received from one or more multimodal sensor arrays disposed on its associated robotic gripper's fingers, and is configured (e.g., by including a USB or other transceiver circuit) to transmit the tactile information to one or both of the arm control circuit and the interface computer. By configuring each gripper controller to generate separate tactile information and finger control signals, the present invention facilitates generating and recording physical parameter values in an encoded format while also allowing the gripper controller to directly control the gripper fingers (i.e., by generating the finger control signals in a format that directly causes the finger actuators to perform an accident/prevention operation. In a specific embodiment the arm control circuit is configured to transmit system gripper control signals to the gripper's finger actuators (i.e., in addition to other primary robot control signals including the arm control signals transmitted to the arm actuators) during a first "normal" operating period (e.g., while current sensor data fails to match at least one stored set of indicator parameter values), and the finger control signals generated by the gripper controller form at least a portion of the secondary robot control signals generated when a potential imminent accident/failure is detected (i.e., when the measured physical parameter values match an associated set of stored indicator parameter values). By configuring the arm controller to generate primary robot control signals during normal robot operating periods and configuring the gripper controller to generate secondary robot control signals that effectively override (supersede) the primary robot control signals when a potential imminent accident/failure is detected (i.e., by way of transmitting the finger control signals directly to the finger actuators), the present invention both enhances normal operating efficiency while providing reduced latency to prevent or mitigate the potential accident/failure.

In some embodiments each work cell includes at least one of a range/distance (e.g., radar) sensor configured to generate range data and one or more cameras configured to generate image data (visual input, e.g., RGB and/or depth), where the range data and/or image data is used to supplement the measured physical parameter values provided by the multimodal sensor arrays. In some embodiments, at least one external (first) camera is disposed external to the work cell's robotic system and one or more gripper-mounted (second) cameras are disposed on the robotic system (e.g., the robot arm and/or the robotic gripper). In a presently preferred embodiment, up to ten external cameras are configured to generate wide angle (first) robot operation image data that is passed to the gripper/arm controllers for purposes of coordinating gripper operations and/or provided to the interface computer for transmission to the cloud server. The gripper-mounted cameras are configured to generate close-up (second) image data showing interactions between the gripper's fingers and target objects that is passed to the gripper controller for processing with the measured physical parameter values (sensor data) received from the multimodal sensor arrays and the range data received from the range sensors. By providing image data and/or range data in addition to the measured physical parameter values, each work cell is further enabled to reliably record all information required to diagnose possible robotic system inefficiencies (e.g., to accurately diagnose the causes of robot operation accidents/failures).

In alternative specific embodiments each multimodal sensor array is disposed on an associated gripper finger structure and includes a set of multiple sensors including an array of pressure sensors and one or more additional sensors, where each of the pressure sensors and additional sensors is configured to generate an associated single-sensor data (measured physical parameter) value. In an exemplary embodiment, the set of sensors of each multimodal sensor array includes a two-dimensional array of pressure sensors and one or more of (i) one or more temperature sensors, (ii) one or more vibration sensors and (iii) one or more proximity sensors. In the presently preferred embodiment, the pressure sensors are piezoelectric-type sensors including piezoelectric ceramic material (e.g., lead zirconate titanate (PZT)) structures sandwiched between solder flux layers and electrodes (contact pads) formed on opposing surfaces of two PCB stack-ups, and is further enhanced by implementing a Faraday cage that shields each PZT structure from electronic noise. In other embodiments the pressure sensors may be implemented using one or more other piezoelectric materials or sensor types, such as strain gauges, capacitive pressure sensors, cavity-based pressure sensors, piezoresistive sensors or piezoelectric sensors, and the pressure sensors forming each pressure sensor array may be arranged in a symmetric pattern or an asymmetric/random pattern. In alternative embodiments the one or more additional sensors include one or more temperature sensors comprising resistive temperature detectors (RTD), thermoelectric, or other variants, one or more vibration/texture sensor (e.g., either piezoelectric/piezoresistive or MEMS-based sensor configured to detect vibrations, and at least one proximity sensor (e.g., a capacitive-coupling-type sensing element). In alternative embodiments, these additional sensor(s) are fabricated/mounted on the same PCB stack-up as the pressure sensors and/or disposed on a different PCB stack-up from the pressure sensors.

In a presently preferred embodiment the robotic system includes multiple multimodal sensor arrays, where each multimodal sensor array is disposed on an associated finger structure of the system's gripper. To facilitate the efficient transfer and processing of the resulting large amount of sensor data, each multimodal sensor array includes an associated sensor data processing circuit that receives the single-sensor sensor data (measured physical parameter) values from the multimodal sensor array's set of multiple sensors over multiple parallel signal lines, and transmits the single-sensor sensor data values to the gripper controller in the form of a finger-level sensor data signal. In a preferred embodiment the multiple sensors and the associated sensor data processing circuit are integrally connected to (i.e., respectively mounted onto) a shared printed circuit board (PCB) structure. This sensor-array-and-processing arrangement allows the multimodal sensor arrays to efficiently transmit measured physical parameter values to the gripper controller and/or the arm controller using a serial data bus, which in turn simplifies the associated controller's task of processing different sensor-type data received from multiple multimodal sensor arrays disposed on various gripper fingers in order to quickly identify potentially harmful or dangerous operating conditions. In a specific embodiment the sensor data processing circuit of each multimodal sensor array is configured such that the single-sensor data values from each of the individual sensors are transmitted in parallel through associated signal conditioning (pre-processed) circuits to a sensor data collection circuit, which then transmits the collected values on a serial data line to a finger-level generation circuit for conversion into a corresponding finger-level sensor data signal, which is then transmitted on a serial signal line to the gripper controller. By providing multiple multimodal sensor arrays on each gripper finger, the work cells of the present invention provide rich sensory tactile data that facilitates the efficient development of optimal robot operating processes. In addition, by combining the multiple sensors of each multimodal sensor array with an associated sensor data processing circuit, the present invention facilitates the transfer of large amounts of sensor data over a relatively small number of signal lines.

In some embodiments the operating systems utilized by the controller and/or interface computer to perform robot operations utilizes one or more AI models. Such AI models are utilized to both augment each robot systems' capabilities beyond simple pre-programmed repetitive tasks, and also to react/adapt to new situations. In such embodiments the operating system updates transmitted to each work cell from the cloud computer may include updated AI models that have been developed by analyzing the tactile information and other data collected from all of the work cells.

In one embodiment the network is configured to facilitate an arrangement in which the cloud server is controlled and operated by a robot system service provider, and the work cells are utilized by different client entities having a contractual arrangement with the robot system service provider. To facilitate this arrangement such that tactile information and other sensor data generated by each work cell is readily available for transmission to the cloud server while the security (privacy) of proprietary information owned by the client entities is maintained, both the cloud server and each work cell are configured to utilize at least two separate databases: a first database that includes shared data/information, and a second database that includes restricted or proprietary data/information. Specifically, each work cell is configured to include two databases that are either integrated into or otherwise accessible by way of the work cell's interface computer: a network (first) database and a local (second) database. Similarly, the cloud server is configured to utilize restricted (first) work cell information database and a shared data (second) sensor data/master operating system update database.

In an exemplary embodiment the network database implemented by each work cell is configured to store data that is written to or read from the cloud server via the network bus and the work cell's interface computer. That is, the network database is configured to allow the cloud server to both perform automatic operating system updates and automatic downloads of sensor and work cell operating data from each work cell on a real-time or delayed synchronization basis. For example, operating system updates (including AI model updates) and optional updated training features transmitted from the cloud server are stored in the network database of each work cell. In addition to the sensor data (mentioned above), additional shared data/information that may be stored by each work cell for transfer to the network database may include grasping performance information, number of grasps performed, number of successful grasps, ongoing maintenance related data, bug reports and other general operating data that may be used to facilitate the efficient diagnosis of problems and the identification of other service-related issues associated with each work cell. In one embodiment, such additional shared data/information is transformed in a privacy preserving manner before being stored on the network database.

In another exemplary embodiment the local (second) database of each work cell is configured to store proprietary data owned by the work cell owner/operator (i.e., the network client). Such proprietary data may include a specific sequence of actuator signals developed by a given work cell's owner/operator that provide the owner/operator a competitive advantage over other work cell owners/operators. In one embodiment the proprietary data stored in each work cell database is protected from access by the cloud server. In another embodiment, each work cell database may be configured to allow the cloud server restricted access (i.e., limited in a privacy preserving manner) to some or all of the proprietary data.

In other embodiments work cell (first) database utilized by the cloud server is configured to store specific work cell-related information for all of the network's work cells, and the sensor data/OS-update master file (second) database that is configured to store measured physical parameter values and other data collected from the work cells for analysis, along with and a master file of updated improved/updated operating system software that is transmitted to the work cells on a real-time delayed synchronization basis. In an exemplary embodiment, the work cell information database is configured to store data associated with the robot mechanism configuration and operating history for each work cell (e.g., specific or custom configuration features, number of operations performed by each structure and actuator of the associated robot mechanism, etc.), and this information is utilized by the cloud server to determine, for example, which accident/failure avoidance operations from the master list are applicable to a given work cell. For example, some accident/failure avoidance operations may apply to one specific configuration (e.g., systems configured to use three-fingered-gripper mechanisms) and not to alternative configurations (e.g., systems configured to use two-fingered-gripper mechanisms), and other accident/failure avoidance operations may apply only to robot mechanisms having grippers that have performed 10,000 grasping operations without service. In another exemplary embodiment, the sensor data/OS-update master file database may include, for example, a master list of accident/failure avoidance operations (e.g., one or more sets of measured physical parameter values that indicate the potential imminent reoccurrence of one or more associated robotic accidents/failures, along with associated secondary robot control signals that, when performed by a robot mechanism, prevent the associated robotic accident/failures' reoccurrence). During an exemplary database synchronization process involving a specific work cell, the cloud server identifies a group of accident/failure avoidance operations that are applicable to a given work cell's specific configuration, the cloud server verifies that the given work cell's system database includes a copy of the identified group, and automatically synchronizes (i.e., transmits over the network bus) the work cell's system database to include any new or updated accident/failure avoidance operations on a real-time or delayed synchronization basis.

BRIEF DESCRIPTION OF THE DRAWINGS

These and other features, aspects and advantages of the present invention will become better understood with regard to the following description, appended claims, and accompanying drawings, where:

DETAILED DESCRIPTION OF THE DRAWINGS

The present invention relates to a computer-based method for managing a network of similar robotic systems in a way that greatly enhances the capabilities of the networked robotic systems. The following description is presented to enable one of ordinary skill in the art to make and use the invention as provided in the context of a particular application and its requirements. As used herein, directional terms such as "upper", "lower", "lowered", "front" and "back", are intended to provide relative positions for purposes of description and are not intended to designate an absolute frame of reference. With reference to electrical connections between circuit elements, the terms "coupled" and "connected", which are utilized herein, are defined as follows. The term "connected" is used to describe a direct connection between two circuit elements, for example, by way of a metal line formed in accordance with normal integrated circuit fabrication techniques. In contrast, the term "coupled" is used to describe either a direct connection or an indirect connection between two circuit elements. For example, two coupled elements may be directly connected by way of a metal line, or indirectly connected by way of an intervening circuit element (e.g., a capacitor, resistor, inductor, or by way of the source/drain terminals of a transistor). Various modifications to the preferred embodiment will be apparent to those with skill in the art, and the general principles defined herein may be applied to other embodiments. Therefore, the present invention is not intended to be limited to the particular embodiments shown and described but is to be accorded the widest scope consistent with the principles and novel features herein disclosed.

Figure 1:
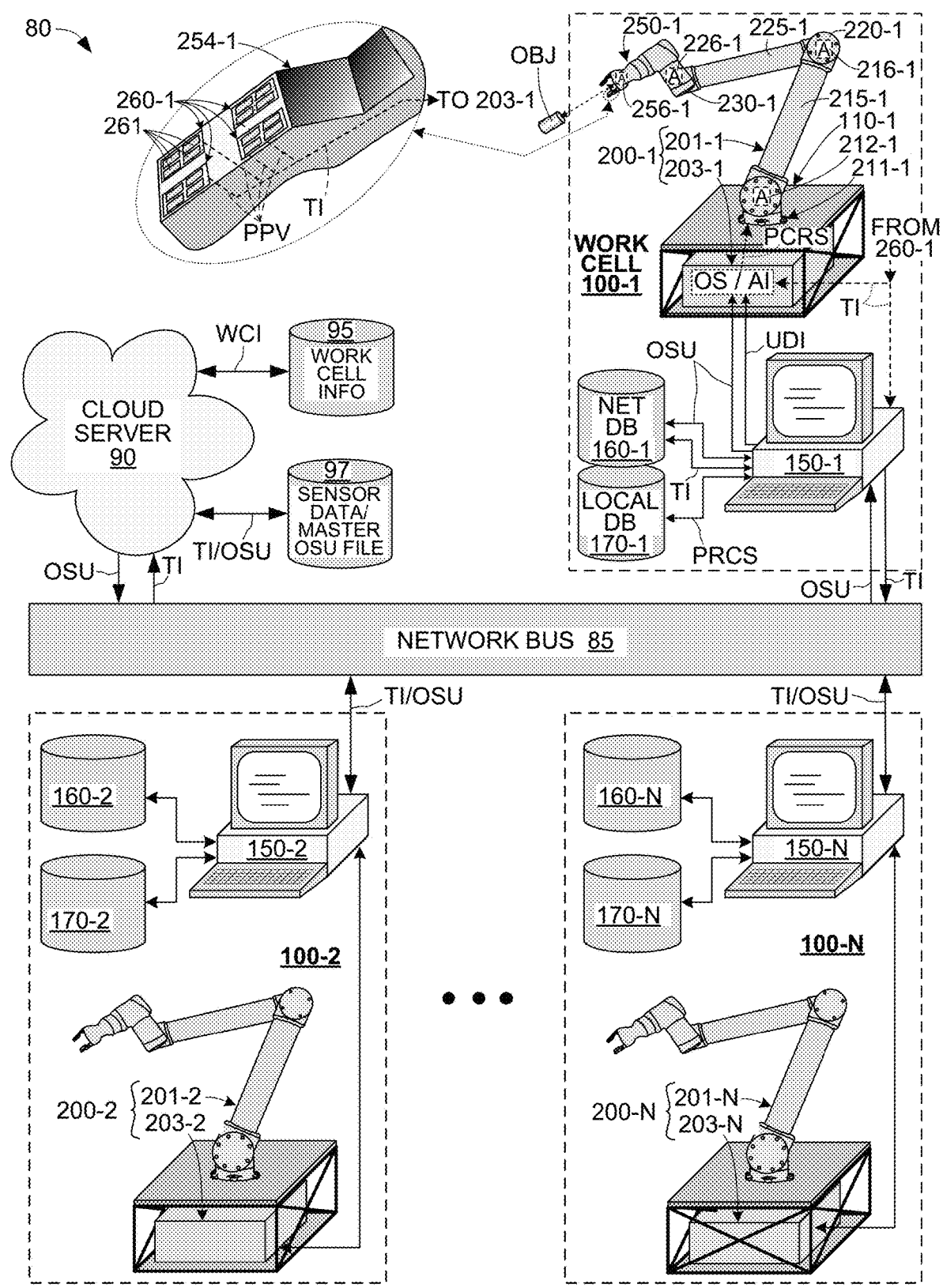
FIG. 1 is a diagram depicting an exemplary robotic network including a cloud server and multiple robot systems according to a generalized embodiment of the present invention.

FIG. 1 shows an exemplary robotic network 80 configured to facilitate network communication events involving data transmissions between a cloud server 90 and multiple work cells 100-1, 100-2 . . . 100-N, which are collectively referred to below as "work cells 100-1/2 . . . N".

Exemplary network communication events are described below in a greatly simplified form as data transmissions (electronic messages) sent over a network bus 85 to which the cloud server 90 and work cells 100-1/2 . . . N are respectively operably coupled. In a practical embodiment, robot network 80 is configured as a software-defined networking in a wide area network (SD-WAN) in which cloud server 90 and work cells 100-1/2 . . . N respectively implement secure communication hardware (e.g., Fortigate 60F gateway/router/firewall appliances), and network communication events (data transmissions) are encoded for privacy using a selected virtual private network (VPN) protocol (e.g., IPsec VPN) and transmitted over network bus 85, which in this case is the Internet. In other embodiments, network bus 85 may be implemented using a local area network and/or wireless data transmissions. Note that the network communication events mentioned below are greatly simplified for brevity in view of these alternative networking configurations. For example, practical secure transmission hardware and other details associated with establishing such SD-WAN-type network arrangements are known to those skilled in the networking arts, and are therefore omitted from the figures and following description, but this omission is not intended to be limiting unless specified in the appended claims.

In the following description all network communication events involve point-to-point transmissions between cloud server 90 and one of work cells 100-1/2 . . . N (that is, work-cell-to-work-cell transmission are not supported by robotic network 80). For example, a first network communication event may involve an updated OS transmitted from cloud server 90 to work cell 100-1, a second event may involve a separate transmission of the updated OS from cloud server 90 to work cell 100-2, and a third event may involve a data transmission from work cell 100-1 to cloud server 90. Although the network communication events described herein are point-to-point, this data transmission arrangement is not intended to be limiting. For example, network bus 85 may be implemented using a local area network and/or wireless data transmissions, and robotic network 80 may support work-cell-to-work-cell transmissions, for example, by way of forming one or more sub-networks respectively including two or more work cells).

Referring to the upper left portion of FIG. 1, cloud server 90 functions as a network host by way of collecting tactile information TI (which includes measured physical parameter values, as described below) from at least some of work cells 100-1/2 . . . N, and by automatically transmitting operating system updates OSU to work cells 100-1/2 . . . N for reasons explained below. Note that tactile information TI is generated in accordance with robotic operations performed by each work cell's robotic system, and each work cell is typically utilized in different ways and at different times from the other work cells. Accordingly, even though each work cell is similarly configured and generates tactile information based on similarly measured physical parameter values (e.g., the temperature of a grasped target object), the measured physical parameter values tactile information TI transmitted from a given work cell (e.g., work cell 100-1) is almost always different from the measured physical parameter values included in tactile information TI received from another work cell (e.g., work cell 100-2). Accordingly, correlating the tactile information TI received from multiple work cells 100-1/2 . . . N provides a more efficient and reliable basis for addressing non-optimal processes (e.g., identifying both conditions that give rise to an accident, and ways to improve the operating system to prevent reoccurrences of the accident) than that generated by tactile information from a single work cell.

In one embodiment robotic network 80 is configured to facilitate an arrangement in which the cloud server 90 is controlled and operated by a host entity that is a robot system service provider, and work cells 100-1/2 . . . N are utilized by different client entities having a contractual arrangement with the robot system service provider. To facilitate this arrangement, cloud server 90 is configured to utilize restricted (first) work cell information (WORK CELL INFO) database 95 and a shared data (second) sensor data/master operating system update (SENSOR DATA/MASTER OSU) database 97. Work cell information database 95 is configured to store specific work cell-related information (e.g., configuration and model information, service information such as general system health, number of actions performed, etc.) for each work cell 100-1/2 . . . N, and the sensor data/OS-update master file database 97 is configured to store measured physical parameter values (e.g., tactile information TI) and other data (e.g., visual input) collected from the work cells for analysis, along with and a master file of operating system updates OSU that are transmitted from cloud server 90 to work cells 100-1/2 . . . N on a real-time delayed synchronization basis. In an exemplary embodiment, work cell information database 95 is configured to store work cell information WCI, which includes data associated with the robot mechanism configuration and operating history for each work cell 100-1/2 . . . N (e.g., specific or custom configuration features, number of operations performed by each structure and actuator of the associated robot mechanism, etc.), and sensor data/OS-update master database 97 may include, for example, a master list of accident/failure avoidance operations (e.g., one or more sets of measured physical parameter values that indicate the potential imminent reoccurrence of one or more associated robotic accidents/failures, along with associated secondary robot control signals that, when performed by a robot mechanism, prevent the associated robotic accident/failures' reoccurrence).

Work cells 100-1/2 . . . N of robotic network 80 respectively include an interface computer and one or more robotic systems, where each robotic system includes one or more robot mechanisms having an associated control circuit. For example, referring to the upper right portion of FIG. 1, work cell 100-1 includes an interface computer 150-1 and a robotic system 200-1, where robotic system 200-1 includes a robot mechanism 201-1 and a control circuit 203-1. Similarly, referring to the lower portion of FIG. 1, work cell 100-2 includes an interface computer 150-2 and a robotic system 200-2 comprising a robot mechanism 201-2 and a control circuit 203-2, and work cell 100-N includes an interface computer 150-N and a robotic system 200-N comprising a robot mechanism 201-N and a control circuit 203-N. In a presently preferred embodiment, robot mechanisms 201-1 to 200-N of robotic systems 200-1 to 200-N have similar or identical configurations. Therefore, for brevity, the configuration and operation of work cells 100-1/2 . . . N is described below with reference to interface computer 150-1 and robotic system 200-1 of work cell 100-1 (i.e., the following description of interface computer 150-1, robot mechanism 201-1 and control circuit 203-1 effectively describes operations performed by corresponding elements of work cells 100-2 to 100-N).

Referring again to work cell 100-1, interface computer 150-1 is configured to facilitate two-way communications between control circuit 203-1 of robotic system 200-1 and cloud server 90 (e.g., by way of data transmissions over network bus 85), and also configured to perform additional functions related to the operation of work cell 100-1. In the depicted exemplary embodiment, interface computer 150-1 includes transceiver and other hardware circuitry (not shown) that is operably configured to receive an operating system update OSU from cloud server 90 over network bus 85, and configured to transmit tactile information TI to cloud server 90 over network bus 85 (note that operating system update OSU and tactile information TI are described below). Interface computer 150-1 is also configured to transfer received operating system update OSU to control circuit 203-1 for reasons described herein and is also configured to receive tactile information TI from robotic system 200-1. In a presently preferred embodiment interface computer 150-1 is also configured as a local input/output device that facilitates the entry of user-designated instructions UDI by a user/owner, where user-designated instructions UDI represent a generalized form of instructions utilized to control robotic system 200-1 such that it performs the user/owner's desired specific robot operation.

As indicated in FIG. 1, in one embodiment work cells 100-1/2 . . . N respectively include a network database (NET DB) 160-1/2 . . . N and a local database (LOCAL DB) 170-1/2 . . . N that are implemented by memory circuits integrated into each work cell's interface computer 150-1/2 . . . N, or are implemented by external storage devices that are accessible by an associated interface computer 150-1/2 . . . N. That is, interface computers 150-1/2 . . . N are configured to format and utilize associated network databases 160-1/2 . . . N and associated local databases 170-1/2 . . . N in the manner described below.

Network databases 160-1/2 . . . N function to facilitate the upload transfer of measured physical parameter values from work cells 100-1/2 . . . N to cloud server 90, and to optionally also facilitate the automatic download transmission of new operating system updates OSU to control circuits 203-1/2 . . . N. Network databases 160-1/2 . . . N facilitate the transfer of measured physical parameter values by way of storing accrued tactile data TI (including measured physical parameter values) in a way that allows cloud server 90 to both upload and download (read/transfer and store) the accrued tactile information TI into sensor data/master OSU database 97. The storage of tactile data TI in network databases 160-1/2 . . . N is performed by associated interface computers 150-1/2 . . . N, which are respectively configured to receive tactile data TI either directly from an associated multimodal sensor array 260-1/2 . . . N or by from an associated control circuit 203-1/2 . . . N. Network databases 160-1/2 . . . N also optionally facilitate automatic operating system updates by way of storing operating system updates OSU transmitted from cloud server 90 and other public data (e.g., updated training features). For example, network database 160-1 is configured to store tactile information TI (i.e., measured physical parameter values PPV and other data generated during the operation of robotic system 200-1), thereby facilitating automatic uploading by cloud server 90 on a real-time or delayed synchronization basis for storage in sensor data/master OSU database 97. In a similar manner, operating system updates OSU that are automatically transmitted to work cell 100-1 from cloud server 90 may be stored in network database 160-1 concurrently with or before being implemented by control circuit 203-1. In addition to tactile information TI, network databases 160-1/2 . . . N may be utilized to store additional shared work-cell-specific data/information that is generated during the operation of robotic systems 200-1/2 . . . N and subsequently uploaded to cloud server 90. For example, control circuit 203-1 may be programmed to monitor various events that occur during robot operations performed by robotic system 200-1 (e.g., number of grasps performed by gripper 260-1), and to record this data/information, which is specific to work cell 100-1, in network database 160-1 for subsequent transfer by cloud server 90 to work cell database 95. Such work-cell-specific information may include, for example, grasping performance information, number of grasps attempted, number of successful grasps, ongoing maintenance related data, bug reports and other general operating data that may be used to facilitate the efficient diagnosis of problems and the identification of other service-related issues associated with the maintenance of each work cell 100-1/2 . . . N. In one embodiment, such additional shared data/information is transformed in a privacy preserving manner by interface computers 150-1/2 . . . N before being stored on an associated network database 160-1/2 . . . N.

In an exemplary embodiment local databases 170-1/2 . . . N of work cells 100-1/2 . . . N are respectively configured to store proprietary data of each work cell's owner/operator (e.g., the network client) in a way that restricts or prevents access by cloud server 90. For example, in some embodiments proprietary data owned by the owner/operator of work cell 100-1 (e.g., a specific sequence of robot arm movements is stored in work cell database 170-1, which is configured to prevent free access by cloud server 90. In other embodiments, each work cell database 170-1/2 . . . N may be configured to allow the cloud server 90 restricted access (i.e., limited in a privacy preserving manner) to some or all of the proprietary data that might be utilized by a network service provider to further broaden the learning base for purposes of developing improved robotic motion and grasping models (e.g., by utilizing the restricted proprietary data to run both virtual and real-world training exercises designed to generate operational statistics that compare data from the various deployed work cell configurations to gain insights as to which configurations perform best in which circumstances). Of course, any proprietary data that might be accessed by the cloud server is protected (i.e., not synchronized with other data that might be provided to the network's client work cells) and is only applied towards new models developed for the client work cells.

In a preferred embodiment the robotic systems 200-1/2 . . . N of work cells 100-1/2 . . . N have the same or a similar configuration so that tactile information TI generated by one robotic system may be beneficially used to improve the robotic operations performed by all robotic systems 200-1/2 . . . N. As indicated in work cell 100-1, robotic system 200-1 generally include a robotic arm (robot mechanism) 201-1 having a fixed end 211-1 and a gripper (end effector) 260-1 connected to the opposing distal (free) end. Robot operations performed by robotic system 200-1 involve controlling the mechanical movements of robotic arm 201-1 and gripper 250-1 using control signals transmitted from associated control circuit 203-1 such that, for example, gripper 250-1 is caused to grasp and move a target object OBJ. To facilitate the collection of enhanced multimodal sensor data (i.e., tactile information TI), robotic system 200-1 includes one or more multimodal sensor arrays 260-1 (shown in bubble section in upper left portion of FIG. 1), where each sensor array includes different types of sensors 261 that respectively measure associated physical parameter values (e.g., applied gripper pressure, target object temperature and other forms of tactile information). Control circuit 203-1 includes (i.e., is configured to operate in accordance with) an operating system OS (i.e., a software program executed by one or more processors, which may include an AI or machine learning model) that it uses during normal operations to convert user-designated instructions UDI into corresponding primary robot control signals PRCS, which in turn cause the various actuators A of robot mechanism 201-1 to perform the owner/user's desired specific robot operations.

As mentioned above, in a presently preferred embodiment robot mechanism 201-1 is an arm-type mechanism (robot arm) made up of series-connected robot arm structures that are fixedly attached at one end to a base structure and are operably connected to gripper 250-1 (or other end effector) at an opposing distal (free) end. In the simplified embodiment depicted in FIG. 1, fixed base mechanism 211-1 of robot mechanism 201-1 is attached to a table-type base structure 110-1, and includes an upper arm structure 215-1 extending from base mechanism 211-1 to an elbow mechanism 220-1, a forearm structure 225-1 extending from elbow mechanism 220-1 to a wrist mechanism 230-1, and a robot gripper (aka, gripper mechanism, gripper or gripper-type end effecto) 250-1 attached to a distal end of wrist mechanism 230-1. Robot mechanism 201-1 also includes multiple actuators A (only three are shown for brevity), each actuator including a motor control circuit (not shown) configured to turn on/off one or more associated electric motors (not shown) in response to control signals received from control circuit 203-1, thereby causing the interconnected structures forming arm-type robot mechanism to move relative to each other. In the depicted exemplary embodiment, a first actuator 216-1 is disposed in base mechanism 211-1 to facilitate selective rotation and pivoting of upper arm structure 215 relative to base table 110-1, a second actuator 216-1 is disposed in elbow mechanism 220-1 and configured to facilitate selective pivoting of forearm structure 225-1 relative to upper arm structure 215-1, a third actuator 226-1 is disposed in wrist mechanism 230-1 to facilitate selective pivoting of gripper 250-1 relative to forearm structure 225-1, and a fourth actuator 256-1 is disposed in gripper 250-1 that control opening/closing of the gripper's fingers to facilitate grasping and releasing a target object OBJ. Exemplary robot mechanism 201-1 is merely introduced to provide a simplified context for explaining the features and benefits of the present invention, and the configuration of exemplary robot mechanism 201-1 is not intended to limit the appended claims.

Referring to the bubble section provided in the upper-left portion of FIG. 1, gripper mechanism (gripper or gripper-type end effector) 260-1 includes at least one multimodal sensor array 260-1 having multiple sensors (or sets of sensors) 261 that are respectively configured to measure corresponding physical parameter values during each robotic operation involving an interaction between gripper 250-1 and target object OBJ. Gripper 250-1 includes various mechanisms and structures that are operably configured in accordance with known techniques to facilitate gripper operations involving moving two or more opposing gripper fingers to grasp and manipulate target object OBJ during robot operations. As indicated in the bubble section, multimodal sensor array 260-1 is disposed on a corresponding gripper finger 254-1 and includes sensors 261 that are respectively operably configured to generate an associated set of measured physical parameter values PPV in response to interactions between gripper finger 254-1 and target object OBJ, and multimodal sensor array 260-1 is configured to transmit measured physical parameter values PPV (e.g., in the form of tactile information TI, which is generated as described below) to control circuit 203-1 or to interface computer 150-1 during each robotic operation.

Control circuit 203-1 is configured to control robot mechanism 201-1 during robot operations by generating control signals in accordance with user-designated instructions UDI and/or an operating system OS during robot operations, and by transmitting the control signals to the actuators of robot mechanism 201-1 in a sequence defined by user-designated instructions UDI and/or operating system OS. In one embodiment, control circuit 203-1 includes processor circuitry that is programmed (controlled) by way of (i.e., is configured to operate in accordance with) an operating system OS (i.e., a software program) that is configured during normal operations to convert the user-designated instructions UDI into corresponding primary robot control signals PRCS that cause the various actuators of the robot mechanism 201-1 to perform desired specific robot operations. In some embodiments, operating system OS may include an artificial intelligence (AI) or machine learning model configured to augment robotic system capabilities beyond simple pre-programmed repetitive tasks defined by user-designated instructions UDI (e.g., to react to new situations).

According to an aspect of the present invention, cloud server 90 is configured to receive tactile information TI, which includes at least some of the measured physical parameter values generated by the multimodal sensor arrays of work cells 100-1/2 . . . N (e.g., measured physical parameter values PPV generated by array 260-1 of work cell 100-1), and is configured to automatically transmit operating system updates OSU to control circuits 203-1/2 . . . N of work cells 100-1/2 . . . N. In one embodiment, tactile information TI received from two or more of work cells 100-1/2 . . . N is utilized to diagnose non-optimal robotic operations by the network host/service provider, and new operating system updates OSU that are generated to improve robot operations are automatically transmitted (downloaded) by cloud server 90 to control circuits 203-1/2 . . . N of work cells 100-1/2 . . . N (i.e., by way of network bus 85 and interface computers 150-1/2 . . . N). That is, before a given automatic update (i.e., before a given operating system update OSU is downloaded to any of work cells 100-1/2 . . . N), each control circuit 203-1/2 . . . N generates control signals in accordance with its currently implemented (initial/non-updated) version of operating system OS, and after the given automatic update (i.e., after the given operating system update OSU is downloaded to all of work cells 100-1/2 . . . N), each control circuit 203-1/2 . . . N generates control signals in accordance with the newly updated operating system (i.e., any improvements to the OS provided with the given operating system update OSU are only implemented after the automatic update).

Figure 2:
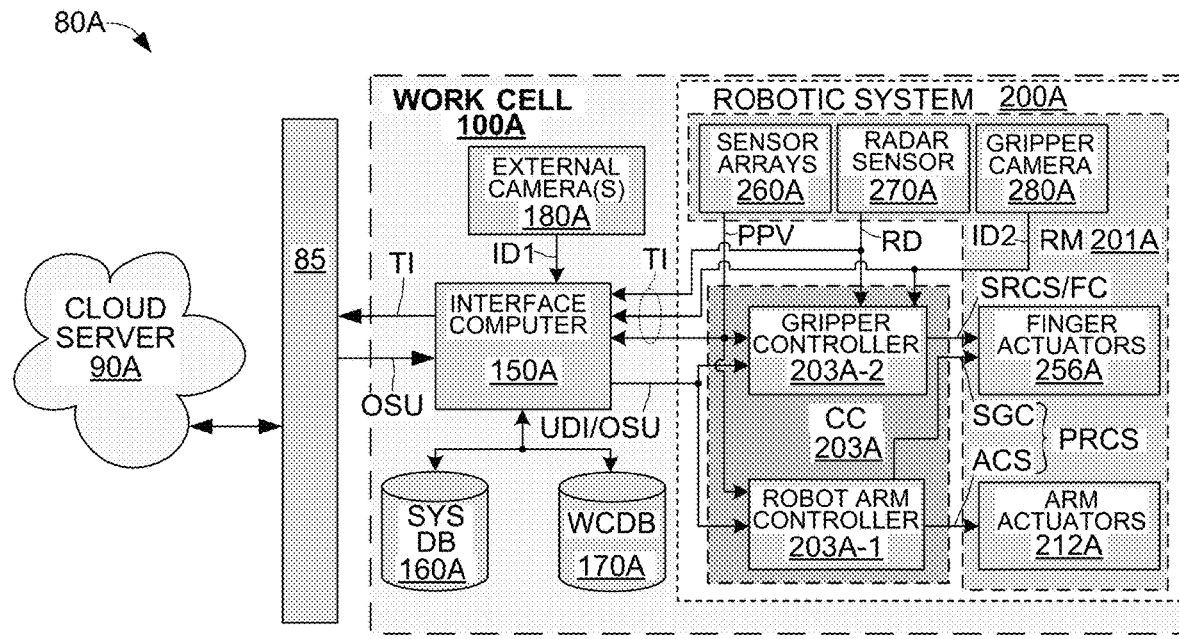
FIG. 2 is a simplified circuit diagram showing a robotic network according to a specific embodiment of the present invention.
Figure 3:
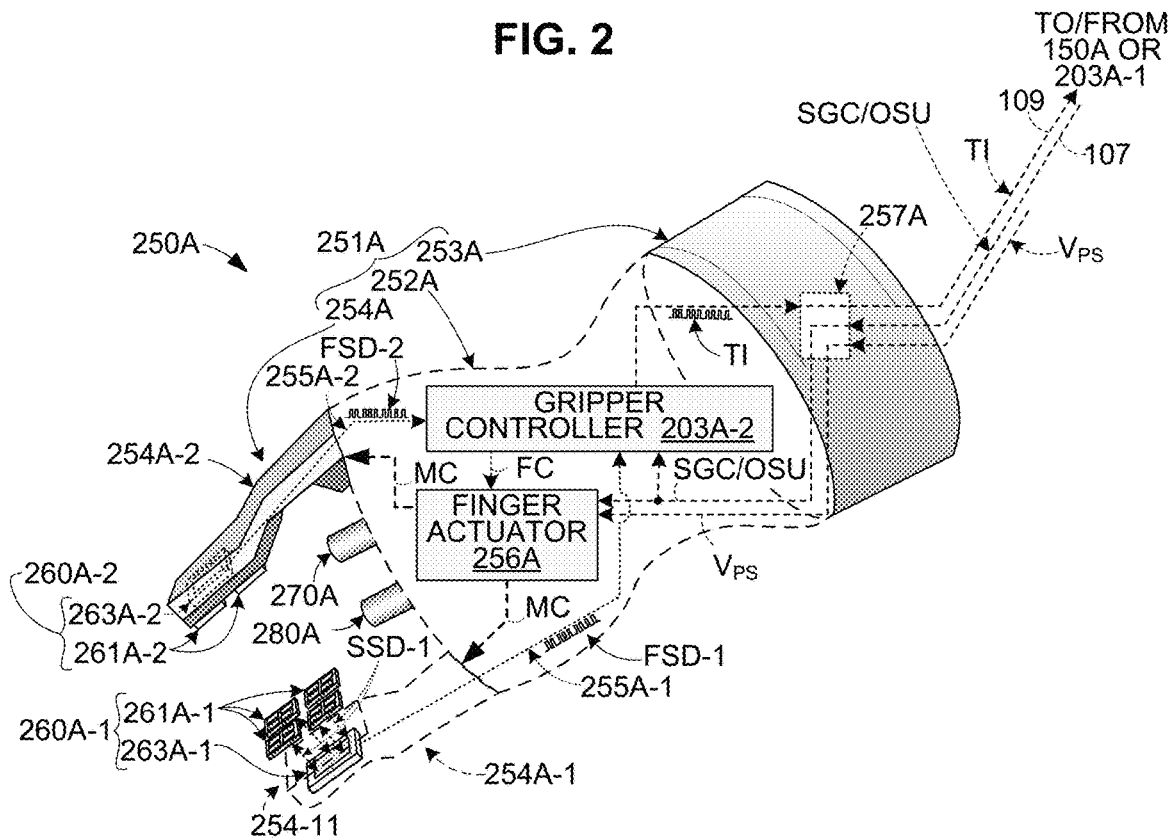
FIG. 3 is a partial perspective view of an exemplary gripper utilized in a work cell of the network of FIG. 2 according to a specific embodiment of the present invention.

FIGS. 2 and 3 depict a simplified robotic network 80A according to another embodiment including a work cell 100A connected to cloud server 90A by way of network bus 85. Cloud server 90A and network bus 85 are configured and operate essentially as described above with reference to FIG. 1. Work cell 100A is intended to represent one of multiple similar work cells coupled to cloud server 90A in the manner described above with reference to FIG. 1. Work cell 100A is similar to work cell 100-1 (FIG. 1) in that it includes an interface computer 150A and a robotic system 200A, where robotic system 200A includes an arm-type robot mechanism (RM) 201A and a control circuit 203A. Although not specified in FIG. 2, robot mechanism 201A is understood to include gripper mechanism 250A, which is shown in FIG. 3. Various features of work cell 100A that differ from corresponding portions of work cell 100-1 (FIG. 1) are described in detail below. All other portions of work cell 100A that are not specifically mentioned below are understood to operate in a manner consistent with corresponding portions described above with reference to FIG. 1. For example, cloud server 90A functions to automatically upload tactile information TI from system database 160A and to automatically download operating system updates OSU to control circuit 203A, and interface computer 150A functions to facilitate the upload/download transmissions and to facilitate the generation of user-defined instructions UDI that are passed to control circuit 203A as described above.

According to a first feature difference of work cell 100A, control circuit (CC) 203A is implemented using two separate controller (e.g., microprocessor) circuits: a robot arm controller 203A-1 and a gripper controller 203A-2. Robot arm controller 203A-1 is mounted in the manner described above with reference to control circuit 203-1 (e.g., on a table or other base structure), and as indicated in FIG. 3, gripper controller 203A-2 is mounted on gripper 260A. In the exemplary embodiment shown in FIG. 2, robot arm controller 203A-1 is configured by way of a current operating system (or a portion thereof) to generate primary robot control signals PRCS during normal robotic operations, where primary robot control signals PRCS include both arm control signals ACS, which are transmitted to arm actuators 212A, and system gripper control signals SGC, which are transmitted to finger actuators 256A. In contrast, gripper controller 203A-2 is configured by way of the current operating system (or a portion thereof) to receive and process tactile information TI in the manner described below during normal operations, and to generate one or more secondary robot control signals SRCS when the tactile information indicates an abnormal operating condition. That is, during normal operations all control signals utilized to control the movements of robot arm mechanism 201A and gripper 260A are generated by robot arm controller 203A-1, and gripper controller 203A-1 only functions to receive and process tactile information TI in the manner described below. Conversely, when tactile information TI processed by gripper controller 203A-1 indicates an abnormal operating condition, gripper controller 203A-2 generates one or more finger control signals FC that cause gripper 250A to perform a predefined gripping operation (e.g., to close/grasp, open/release or apply a modified gripping pressure to a target object).

The operations performed by robot arm controller 203A-1 and gripper controller 203A-2 will now be described with reference to a greatly simplified rules-based-programming example involving the cold-object-drop accident, which is introduced in the background section (above). As set forth above, the proposed methodology implemented by a robotic network of the present invention involves utilizing multimodal sensor arrays (e.g., array 260B of robotic system 200A) from multiple work cells to collect and correlate measured physical parameter values PPV, which in this example include the temperature of grasped objects and the applied grasping pressure. One skilled in the art would understand that correlating this temperature and pressure data could facilitate identifying the underlying cause of the accidents (e.g., objects are dropped when their temperature is below 10° C.). In addition, once the accident's cause is identified, a suitable corrective action may be devised that, when performed by each work cell, prevents reoccurrence of the cold-object-drop accident. Based on this diagnosis, a corresponding rules-based operating system update OSU is then generated that includes, for example, indicator parameter values suitable for detecting the potential imminent reoccurrence of the cold-object-drop accident (e.g., the indicator parameter values may include a check for currently measured object temperature values equal to or below 10° C.), and also includes one or more corresponding secondary robot control signals SRCS that prevent or mitigate the accident (e.g., one or more finger control signals FC that cause finger actuators 256A to increase gripper pressure to twelve kPa when currently measured physical parameter values match the stored indicator parameter value). After being transmitted to work cell 100A by the cloud server 90A, this operating system update OSU modifies the performance of control circuit 203A during subsequent robot operations, for example, by causing gripper controller 203A-2 to store the indicator parameter value (i.e., object temperature greater than or equal to ten degrees Celsius), to compare the stored value with currently measured temperature values generated by temperature sensor(s) of multimodal sensor array 260A, and to increase the gripper pressure to twelve kPa (e.g., by transmitting finger control signals FC to gripper actuator 256A) whenever a currently measured temperature value is at or below 10° C., thereby preventing reoccurrence of cold-object-drop accidents.

The example set forth above is intended to illustrate how an exemplary operating system update OSU may be generated using a "rules based" programming approach, where stored set of indicator parameter values IPV and associated secondary robot control signal SRCS represent a difference (improvement) between an initial (non-updated) version of the operating system implemented by control circuit 203A prior to receiving the OSU transmission from cloud server 90, and the updated operating system implemented by control circuit 203A after the transmission. That is, before the update, control circuit 203-1 generates control signals in accordance with the earlier/initial (non-updated) version of operating system OS (i.e., control circuit 203-1 generates primary control signal PCRS using gripper control signal SGC and arm control signal ACS even when multimodal sensor arrays 260A detect target objects having temperatures of 10° C. or lower, whereby the intermittent cold-object-drop accident may be repeated). Conversely, after receiving and implementing operating system update OSU, control circuit 203-1 generates secondary control signal SCRS whenever multimodal sensor arrays 260A detect target objects having a temperatures of 10° C., whereby the increased gripper pressure reliably prevents the reoccurrence of the cold-object-drop accident. In other embodiments that implement non-rules-based programming methods, the measured physical parameter values generated by multimodal sensor arrays 260A are also used as indicators, but control of the robot may be decided by any number of additional methods including heuristics that use motion primitives, or "black box" approaches that use neural networks to provide mapping between parameter inputs and action outputs. Statistical methods or machine learning may also be used to predict environmental or system states that might be relevant to direct or even indirect control of hardware and operating systems. An example of direct control is one where sensor data are used as inputs to an algorithm or machine learning model producing commands to a robot controller as output, while indirect control might use a machine learning model to predict where an object of interest is in real-world coordinate space, and use that value as input to a secondary model that sends commands to the robot mechanism. So, while the sensor data generated by the multimodal sensor arrays of the present invention can be useful for dynamic (e.g., on-gripper) responses to events such as anomalies, they can also be used to build predictive models where data are used to update model parameters rather than directly inform an interpretable action. In this context, algorithms or statistical methods comprising machine learning applications generally require data collection from physical systems which are stored, processed and used to learn a model for prediction. Downstream tasks such as storage, processing and training for machine learning may occur directly on hardware that performs collection locally, or in remote clusters, such as the cloud. Here, storage refers to any way of capturing data to be accessed later in time, while processing usually describes methods of data engineering that are required before model training can occur, and as part of data management or transport. This includes operations such as transforming data between types, applying mathematical functions, and generating derivative data representations through annotation or auxiliary machine learning pipelines. Training is the process of learning optimized model parameters by iteratively updating parameters based on raw or processed data. By combining not only raw data from multi-modal sensors, but derived data representations created by the described methods across a network of robotic work cells, the global properties of a behavior model can be optimized more efficiently. New capabilities can be deployed to a single work cell or a network of work cells, and data captured can go back into the "black box" pipeline for further optimization and improvement. Referring again to FIG. 2, work cell 100A is further distinguished in that it includes at least one external camera 180A disposed external to the work cell's robotic system 200A, and at least one range/distance (e.g., radar) sensor 270A and one or more gripper-mounted (second) cameras 280A. As indicated in FIG. 3, range/distance sensor 270A and gripper-mounted cameras 280A are disposed on robotic gripper 250A. In a presently preferred embodiment, up to ten external cameras 180A are configured to generate wide angle (first) image data ID1 that is passed to the control circuit 203A for purposes of coordinating gripper operations and/or provided to interface computer 150A for transmission to cloud server 90A. Range/distance sensor 270A is configured to generate range data RD indicating a measure distance between gripper 250A and a target object. Gripper-mounted cameras 280A are configured to generate close-up (second) image data ID2 showing interactions between the gripper's fingers and target objects that is passed to the gripper controller 203A-2 for processing with the measured physical parameter values (sensor data PPV) received from the multimodal sensor arrays 260A and the range data RD received from range sensor 270A. In one embodiment range data RD is transmitted directly to gripper controller 203A-2, but in other embodiments may be provided to arm controller 203A-1 and/or interface computer 150A. In one embodiment, tactile information TI includes measured physical parameter values PPV, range data RD and at least one of image data ID1 and image data ID2, whereby range data RD and image data ID1 and/or 1D2 are used to supplement the measured physical values PPV provided by the multimodal sensor arrays 260B.

FIG. 3 shows an exemplary gripper 250A utilized by work cell 100A (FIG. 2). Gripper 250A generally includes a gripper mechanism 251A, gripper controller 203A-1 and finger actuators 256A. Gripper mechanism 251A includes a base/frame structure 252A, a connection fixture 253A that is fixedly connected to base structure 252A and configured to operably secure the robotic gripper 250A to a distal end of robot arm mechanism 201A, and gripper fingers 254A-1 and 254A-2 that are movably connected to the base structure 252A. Finger actuator 256A is at least partially disposed on base structure 252A and including a motor/controller/encoder configuration that controls the open/close relative movement of gripper fingers 254A-1 and 254A-2 by way of finger (mechanical) linkages MC. Those skilled in the art understand that the various structures and mechanisms of robotic gripper 250A may be implemented in many ways using techniques known in the art, and that the description of gripper mechanism 251A provided herein is greatly simplified to emphasize the novel aspects of the present invention.

Referring to the left side of FIG. 3, multimodal sensor arrays 260A-1 and 260A-2 are disposed (i.e., integrated into or otherwise mounted on) gripper mechanism 251A. Specifically, multimodal sensor array 260A-1 is mounted onto gripper finger 254A-1, and multimodal sensor array 260A-2 is mounted onto gripper finger 254A-2 such that arrays 260A-1 and 260A-2 are facing each other. Sensor array 260A-1 generally includes a sensor group (set of sensors) 261A-1 and a sensor data processing circuits 263A-1, and sensor array 260A-2 includes a sensor group (set of sensors) 261A-2 and a sensor data processing circuits 263A-2. Sensor groups 261A-1 and 261A-2 are respectively fixedly attached to opposing contact surface portions of gripper fingers 254A-1 and 254A-2 and positioned such that sensor groups 261A-1 and 261A-2 are disposed between a target object (not shown) and sensor data processing circuits 263A-1 and 263A-2, respectively, during operable interactions between robotic gripper 250A and the target object. Each sensor group 261A-1 and 261A-2 includes multiple sensors that respectively generate sensor data values in response to interactions between gripper fingers 254A-1 and 254A-2 and corresponding surface characteristics of a target object during each corresponding robotic system operation. For example, when robotic gripper 250A is controlled to grasp a target object, a sensor of sensor group 261A-1 collects associated single-sensor data value SSD-1 that reflects the interaction between a corresponding contact portion 254-11 of gripper finger 254A-1 and an opposing surface region of the target object, and passes the collected single-sensor data values SSD-1 to sensor data processing circuit 263A-1. Similarly, each sensor of sensor group/set 261A-2 collects sensor data values that reflect interactions between gripper finger 254A-2 and the target object, and passes the collected single-sensor data value to sensor data processing circuit 263A-2. In one embodiment, each sensor of sensor groups 263A-1 and 263A-2 generates one associated single-sensor data value during each sensor data generation cycle (i.e., during each predetermined period of time, such as each one second time period). Accordingly, because each sensor group/set 261A-1 and 261A-2 includes multiple sensors, multiple single-sensor data values are transmitted to sensor data processing circuits 263A-1 and 263A-2 during each sequential cycle. Sensor data processing circuits 263A-1 and 263A-2 are configured to generate corresponding finger-level sensor data signals FSD-1 and FSD-2 in response to the multiple single-sensor data values respectively received from sensor groups 261A-1 and 261A-2. For example, sensor data processing circuit 263A-1 is configured to generate finger-level sensor data signal FSD-1 in according with single-sensor data values SSD-1 received from sensor group 261A-1. In one embodiment sensor data processing circuit 263A-1 is configured to receive single-sensor data values SSD-1 in parallel from sensor group 261A-1 (i.e., such that each single-sensor data values SSD-1 is received on a unique conductive signal path extending from a corresponding sensor of sensor group 261A-1 and a corresponding input terminal of sensor data processing circuit 263A-1), and finger-level sensor data signal FSD-1 is generated as a serial data signal (i.e., such that all of finger-level sensor data signal FSD-1 is transmitted over a single elongated conductor (conductive path) 255A-1 to gripper controller (central data processing circuit) 203A-2. Similarly, sensor data processing circuit 263A-2 is configured to receive single-sensor data values in parallel from sensor group 261A-2, and finger-level sensor data signal FSD-2 is transmitted over a single elongated conductor 255A-2 to gripper controller 203A-2. In some embodiments the generation of finger-level sensor data signals FSD-1 and FSD-2 involves converting single-sensor data values from analog values to digital values. In any case, finger-level sensor data signals FSD-1 and FSD-1 form measured physical parameter values PPV (see FIG. 2) that are provided from sensor arrays 260A-1 and 260A-2 to gripper controller 203A-1. Although not shown in FIG. 3, range data generated by range/distance sensor 270A and image data generated by camera(s) 280A is also provided to gripper controller 203A-2.

Referring to the right-side portion of FIG. 3, in the exemplary embodiment various signals and power Vps are transmitted to gripper 250A along corresponding conductors (wires) during robotic operations. For example, system gripper control signals SGC and operating system updates OSU are transmitted to gripper 250A via a first signal line 107 and tactile information TI generated by gripper controller 203A-2 is transmitted to one or more of interface computer 150A or arm controller 203A-1 on a second signal line 109. Both signal transmissions pass through a connector 257A, with system gripper control signals SGC being supplied to finger actuator 256A and/or gripper controller 203A-2, and operating system updates OSU being supplied to gripper controller 203A-2.

Figure 4:
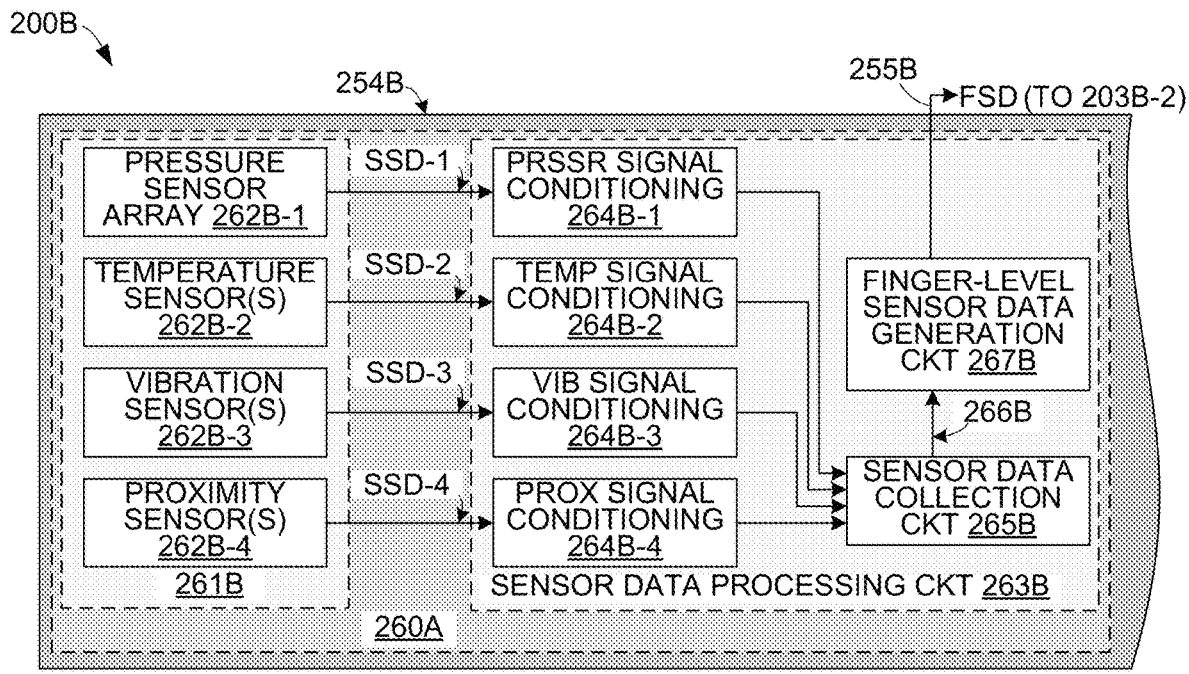
FIG. 4 is a simplified circuit diagram showing a multi-modal sensor array formed on a robot gripper finger according to another specific embodiment of the present invention.
Figure 5:
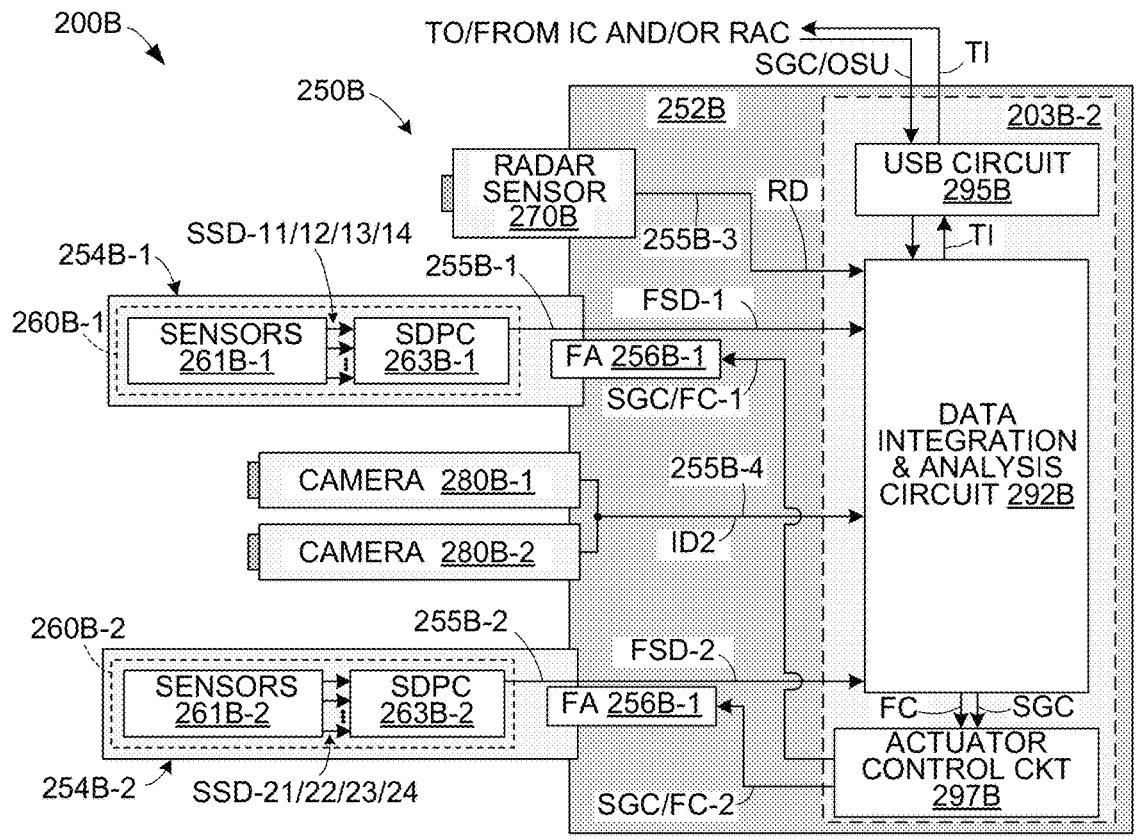
FIG. 5 is a simplified circuit diagram showing a gripper including the multimodal sensor array of FIG. 4 and additional circuitry according to another specific embodiment.

FIGS. 4 and 5 are block diagrams showing portions of a robotic system 200B, which forms part of a work cell (not shown) implemented in a robotic network according to another exemplary embodiment of the present invention.

FIG. 4 shows portion of a robotic gripper finger 254B including a multimodal sensor array 260B in accordance with another exemplary embodiment of the present invention. Similar to that of the previous embodiment, multimodal sensor array 260B includes a sensor group/set 261B and a sensor data processing circuit 263B that are disposed on a contact region of robotic finger 254B. and configured One or more other gripper fingers, a gripper mechanism and other portions of a hierarchical sensor architecture that includes sensor group 261A and a sensor data processing circuit 263A are omitted for brevity.

Referring to the left side of FIG. 4, sensor group 261A includes a pressure sensor array 262B-1, one or more temperature sensors 262B-2, one or more vibration/texture sensors 262B-3, and one or more proximity sensors 262B-4. In one embodiment, each pressure sensor of pressure sensor array 262B-1 includes one of a strain gauge, a capacitive pressure sensor, a cavity-based pressure sensor, a piezoelectric sensor and a piezoresistive sensor, where each sensor is configured to generate a single-sensor data value SSD-1. Temperature sensors 262B-2 are omitted in some embodiments, and in other embodiments are implemented using resistive temperature detectors (RTD), thermoelectric sensors or other variants, and are configured to generate single-sensor data values SSD-2. Vibration/texture sensors 262B-3 are omitted in some embodiments, and in other embodiments are implemented using either piezoelectric or piezoresistive elements or using a MEMS-based sensor configured to detect vibrations, and are configured to generate single-sensor data values SSD-3. Proximity sensors 262B-4 are omitted in some embodiments, and in other embodiments are implemented using a capacitive-coupling-type sensing element, and are configured to generate single-sensor data values SSD-4.

Sensor data processing circuit 263B includes signal conditioning circuits 264B-1 to 264B-4, a sensor data collection circuit 265B and a finger-level sensor data generation circuit 267B. Signal conditioning circuits 264B-1 to 264B-4 are respectively disposed to condition single-sensor data values SSDA-1 to SSDA-4, and to pass the conditions sensor data values in parallel to sensor data collection circuit 265B. Sensor data collection circuit 265B receives the parallel sensor data values and transmits them to finger-level sensor data generation circuit 267B via a serial signal line 266B. Finger-level sensor data generation circuit 267B converts sensor data values SSD-1 to SSD-4 into a finger-level sensor data signal FSD that is transmitted on a serial signal line 255B for processing by a gripper controller 203B-2 (shown in FIG. 5).

FIG. 5 shows a greatly simplified gripper 250B utilized in a robotic system 200B in the manner described above, where gripper 250B includes two gripper fingers 254B-1 and 254B-2 are operably connected to a base frame structure 252B and manipulated by way of actuators 256B-1 and 256B-2 in a manner similar to that described above with reference to FIG. 3. Other features and details associated with the mechanism of gripper 250B are omitted for brevity.

Similar to the fingers of gripper 250A (FIG. 3), gripper fingers 254B-1 and 254B-2 respectively including associated multimodal sensor arrays 260B-1 and 260B-2 (i.e., multimodal sensor arrays 260B-1 and 260B-2 are respectively mounted on associated gripper fingers 254B-1 and 254B-2). In addition, each multimodal sensor array 260B-1 and 260B-2 is configured in the manner described with reference to FIG. 4 to include both an associated sensor set 261B-1 and 261-2 and an associated sensor data processing circuit 263B-1 and 263B-2. Specifically, multimodal sensor array 260B-1 includes sensor set 261B-1 and an associated sensor data processing circuit 263B-1, where sensor group/set 261B-1 includes sensors 262B-1 to 262B-4 (shown in FIG. 4) that respectively transmit single-sensor sensor data (measured physical parameter) values SSD-11, SSD-12, SSD-13 and SSD-14 to sensor data processing circuit 263B-1, and sensor data processing circuit 263B-1 is configured as shown in FIG. 4 to generate finger-level sensor data signal FSD-1, which is transmitted on signal line 255B-1 to a first serial data input terminal of gripper controller 203B-2. Similarly, multimodal sensor array 260B-2 includes sensor set 261B-2 and an associated sensor data processing circuit 263B-2, where sensor set 261B-2 generates/transmits single-sensor sensor data values SSD-21, SSD-22, SSD-23 and SSD-24 to sensor data processing circuit 263B-2, and sensor data processing circuit 263B-2 is configured to generate/transmit finger-level sensor data signal FSD-2 on signal line 255B-2 to a second serial data input terminal of gripper controller 203B-2. Robotic system 200B also includes a radar (range/distance) sensor 270B and cameras 280B-1 and 280B-2 that are also disposed on gripper 250B and configured such that radar sensor 270B generates range data RD that is transmitted via an associated signal line 255B-3 to a third input terminal of gripper controller 203B-2, and cameras 280B-1 and 280B-2 generates image data ID2 that is transmitted via signal line(s) 255B-4 to a fourth input terminal of gripper controller 203B-2.

Gripper controller 203B-2 is disposed on base structure 252B of robotic gripper 250B, and is coupled to receive finger-level sensor data signals FSD-1 and FSD-2 from sensor data processing circuits (SDPC) 263B-1 and 263B-2, respectively by way of elongated conductors 255B-1 and 255B-2 that respectively extend partially along fingers 254B-1 and 254B-2. For example, gripper controller 203B-2 is coupled to receive finger-level sensor data signals FSD-1 from SDPC 263B-1 by way of elongated conductor 255B-1, which extends partially along gripper finger 254B-1 and a portion of base structure 252B to gripper controller 203B-2. In this embodiment gripper controller 203B-2 includes a data integration and analysis circuit 292B that is configured to generate tactile information TI, for example, by combining finger-level sensor data signals FSD-1 and FSD-N (i.e., physical parameter data), range data RD and image data ID2, and configured to transmit tactile information TI by way of a transceiver circuit 295B (e.g., a USB circuit as shown, or an ethernet circuit) to one of an interface computer (IC) or a robot arm controller (RAC) in the manner described above. In addition, data integration and analysis circuit 292B is configured to process finger-level sensor data signals FSD-1 and FSD-N, range data RD and image data ID2, and to transmit either system gripper control signals SGC or finger control signals FC to an actuator control circuit 297B in accordance with a decision process similar to that described above, whereby system gripper control signals SGC are transmitted to finger actuators 256B-1 and 256B-2 during normal operating conditions, and finger control signals FC are transmitted to finger actuators 256B-1 and 256B-2 during abnormal operating conditions.

Although the present invention has been described with respect to certain specific embodiments, it will be clear to those skilled in the art that the inventive features of the present invention are applicable to other embodiments as well, all of which are intended to fall within the scope of the present invention. For example, although the robotic system of each work cell is described above as comprising a single robot mechanism, each work cell may include two or more robot mechanisms without departing from the spirit and scope of the present invention. Similarly, although each robot mechanism is described herein as including a single end-effector, each robot mechanism may include two or more end-effectors/grippers without departing from the spirit and scope of the present invention. Moreover, the robotic system configurations described herein may be modified to include one or more features associated with the flex-rigid sensor array structures described in co-owned and co-filed U.S. patent application Ser. No. 16/832,755 entitled "FLEX-RIGID SENSOR ARRAY STRUCTURE FOR ROBOTIC SYSTEMS", or the tactile perception structures described in co-owned and co-filed U.S. patent application Ser. No. 16/832,690 entitled "TACTILE PERCEPTION APPARATUS FOR ROBOTIC SYSTEMS", or the robotic gripper described in co-owned and co-filed U.S. patent application Ser. No. 16/832,800 entitled "ROBOTIC GRIPPER WITH INTEGRATED TACTILE SENSOR ARRAYS", all of which being incorporated herein by reference in its entirety.

The invention claimed is:

1. A network comprising a plurality of work cells that are respectively operably configured to communicate with a cloud server,
   wherein each work cell of the plurality of work cells includes an interface computer and an associated robotic system including a control circuit, where said interface computer of each said work cell is coupled between the cloud server and the control circuit of the associated robotic system,
   wherein said robotic system of each work cell further includes a robot mechanism including a plurality of robot structures and a plurality of first actuators configured to control relative movement of said robot structures in response to control signals received from the control circuit of the associated robotic system, said each robot mechanism also including an end effector operably connected to a distal end of said plurality of robot structures and including at least one second actuator,
   wherein said end effector further includes at least one associated multimodal sensor array comprising a plurality of sensors respectively configured to measure a plurality of physical parameter values during a robotic operation involving interactions between said end effector and a target object,
   wherein the control circuit of each said work cell is configured to control said robot mechanism during said robot operation by generating control signals in accordance with an operating system, and by transmitting said control signals to at least one of said first and second actuators, and
   wherein the cloud server is configured to receive at least some of said measured physical parameter values from said plurality of work cells, and configured to automatically transmit an updated operating system to the control circuit of each of said plurality of work cells, whereby said each control circuit generates said control signals in accordance with an initial operating system prior to said automatic update, and said each control circuit generates said control signals in accordance with said updated operating system after said automatic update.

2. The network of claim 1,
   wherein the updated operating system differs from the initial operating system in that the updated operating system includes a stored set of indicator parameter values and an associated secondary robot control signal, and
   wherein, after the cloud server automatically transmits said updated operating system, the control circuit of each said work cell is controlled by the updated operating system to transmit primary robot control signals to one or more actuators of said plurality of actuators of the associated robot mechanism while currently measured physical parameter values received from said at least one associated multimodal sensor array fails to match said a stored set of indicator parameter values, and is controlled to transmit said associated secondary robot control signals to said one or more actuators when the currently measured physical parameter values match said associated set of stored indicator parameter values.

3. The network of claim 1,
   wherein the robot mechanism of each said work cell comprises a robot arm having a fixed base disposed at one end and a robotic gripper connected to said distal end and having a plurality of gripper fingers, and
   wherein the control circuit of each said work cell includes a robot arm controller and a gripper controller, said robot arm controller being configured to control the robot arm by way of transmitting arm control signals to one or more arm actuators operably disposed on the robot arm, and said gripper controller being configured to control operations performed by the robotic gripper by way of transmitting finger control signals to one or more finger actuators that are operably disposed on the robotic gripper.

4. The network of claim 3,
   wherein each said multimodal sensor array is disposed on a corresponding said gripper finger and includes a plurality of sensors that are respectively operably configured to generate an associated set of said measured physical parameter values in response to interactions between said corresponding gripper finger and the target object during each said interaction between said end effector and said target object, and
   wherein each said gripper controller is further configured to generate both the finger control signals and tactile information in accordance with the measured physical parameter values received from one or more of said multimodal sensor arrays disposed on its associated robotic gripper, and said gripper controller further includes a transceiver circuit configured to transmit the tactile information to one of said arm control circuit and said interface computer.

5. The network of claim 4, wherein the robot arm controller is further configured to transmit system gripper control signals to the finger actuators while the measured physical parameter values fail to match at least one stored set of indicator parameter values, and the gripper controller is further configured to transmit the finger control signals to the finger actuators when the measured physical parameter values match said associated set of stored indicator parameter values.

6. The network of claim 1,
wherein the robotic system of each said work cell includes at least one of a range sensor and a camera, and
wherein at least one of the arm controller, the gripper controller and the interface computer is configured to receive data from said at least one of said range sensor and said camera.

7. The network of claim 1, wherein each said robotic gripper includes a range sensor and one or more cameras, and said gripper controller is configured to receive range data from the range sensor and image data from the one or more cameras.

8. The network of claim 1,
wherein each said multimodal sensor array is disposed on a corresponding gripper finger,
wherein each sensor of said plurality of sensors of said each multimodal sensor array is configured to generate an associated measured physical parameter value, and
wherein said plurality of sensors of said each multimodal sensor array comprises an array of pressure sensors and one or more of a temperature sensor, a vibration sensor, and a proximity sensor.

9. The network of claim 8, wherein each pressure sensor of said array of pressure sensors comprises of one of a strain gauge, a capacitive pressure sensor, a cavity-based pressure sensor, a piezoelectric sensor and a piezoresistive sensor.

10. The network of claim 8,
wherein each said multimodal sensor array further comprises a sensor data processing circuits disposed on said corresponding gripper finger and configured to generate a corresponding finger-level sensor data signal in response to said measured physical parameter value generated by said plurality of sensors, and
wherein said sensor data processing circuits is configured to transmit said corresponding finger-level sensor data signal to said gripper control circuit.

11. The network of claim 8, wherein the control circuit of each said work cell is configured to control said robot mechanism during said robot operation using one of an artificial intelligence model and a machine-learning model.

* * * * *